United States Patent
Park et al.

(10) Patent No.: US 11,928,296 B2
(45) Date of Patent: *Mar. 12, 2024

(54) DISPLAY DEVICE

(71) Applicant: Samsung Display Co., Ltd., Yongin-Si (KR)

(72) Inventors: Jong Seon Park, Yongin-si (KR); Hwan Hee Jeong, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,913

(22) Filed: Oct. 31, 2022

(65) Prior Publication Data
US 2023/0051324 A1    Feb. 16, 2023

Related U.S. Application Data

(63) Continuation of application No. 17/071,954, filed on Oct. 15, 2020, now Pat. No. 11,507,231, which is a continuation of application No. 16/392,522, filed on Apr. 23, 2019, now Pat. No. 10,838,564.

(30) Foreign Application Priority Data

Oct. 1, 2018    (KR) .......................... 10-2018-0117168

(51) Int. Cl.
*G06F 3/044*    (2006.01)
*G06F 3/041*    (2006.01)

(52) U.S. Cl.
CPC .......... *G06F 3/0443* (2019.05); *G06F 3/0412* (2013.01); *G06F 3/04164* (2019.05)

(58) Field of Classification Search
CPC ..................................... G06F 3/0412
See application file for complete search history.

(56) References Cited

U.S. PATENT DOCUMENTS

| 5,876,884 | A | * | 3/1999 | Maeda .................... G03F 7/704 430/394 |
| 10,474,295 | B2 | | 11/2019 | Kim et al. |
| 2006/0146261 | A1 | | 7/2006 | Izawa et al. |

(Continued)

FOREIGN PATENT DOCUMENTS

| CN | 102473049 A | 5/2012 |
| CN | 108073323 A | 5/2018 |

(Continued)

*Primary Examiner* — Nan-Ying Yang
(74) *Attorney, Agent, or Firm* — Innovation Counsel LLP (57) ABSTRACT

A display device may include a display panel, an input sensing unit, and an alignment structure. The display panel may include a sealing member. The input sensing unit may be disposed on the display panel. The input sensing unit may include first-type sensor electrodes directly contacting a face of a first insulator of the display device, a first-type connector electrically connecting the first-type sensor electrodes, second-type sensor electrodes directly contacting the face of the first insulator of the display device, and a second-type connector electrically connecting the second-type sensor electrodes. The alignment structure may overlap the sealing member and may include a transparent member that directly contacts the face of the first insulator of the display device.

21 Claims, 5 Drawing Sheets

(56) References Cited

U.S. PATENT DOCUMENTS

| | | | |
|---|---|---|---|
| 2007/0188757 A1 | 8/2007 | Amsden et al. | |
| 2010/0271572 A1* | 10/2010 | Yokogawa | G02F 1/1345 |
| | | | 349/96 |
| 2012/0127387 A1* | 5/2012 | Yamato | G06F 3/0445 |
| | | | 174/250 |
| 2012/0235951 A1* | 9/2012 | Brown | G06F 3/0412 |
| | | | 345/173 |
| 2012/0319980 A1* | 12/2012 | Nagaoka | H05K 1/0269 |
| | | | 174/250 |
| 2014/0091704 A1* | 4/2014 | Furuie | H05B 33/02 |
| | | | 445/24 |
| 2018/0246362 A1* | 8/2018 | Ohshima | G02F 1/136277 |

FOREIGN PATENT DOCUMENTS

| | | |
|---|---|---|
| KR | 10-2007-0106603 A | 11/2007 |
| KR | 10-2015-0061144 A | 6/2015 |

\* cited by examiner

DISPLAY DEVICE

CROSS-REFERENCE TO RELATED APPLICATIONS

This application is a continuation application of U.S. patent application Ser. No. 17/071,954 filed on Oct. 15, 2020, which is a continuation application of U.S. patent application Ser. No. 16/392,522 filed on Apr. 23, 2019 (U.S. Pat. No. 10,838,564), which claims priority to and the benefit of Korean Patent Application 10-2018-0117168 filed on Oct. 1, 2018 in the Korean Intellectual Property Office; the related applications are incorporated by reference.

BACKGROUND

1. Technical Field

The technical field relates to a display device.

2. Related Art

In general, organic light emitting display devices can be applied to smart phones, tablet personal computers, ultra-slim notebook computers, digital cameras, camcorders, ultra-thin televisions, etc. Organic light emitting display device have various applications.

In an organic light emitting display device, at least two substrates should be sealed to protect an image display unit. A sealing portion is formed between the two substrates, and the two substrates are bonded to each other by applying energy to the sealing portion.

In the bonding process, the substrates should be properly aligned.

SUMMARY

Embodiments may be related a display device including an alignment structure for facilitating alignment between substrates/modules of the display device. The alignment structure may include a transparent conductive member and an opening that exposes the transparent conductive member.

According to an embodiment, a display device may include the following elements: a display panel; and an input sensing unit disposed on the display panel, the input sensing unit in which an alignment structure for alignment of the display panel is formed, wherein the input sensing unit includes: a first sensing electrode including first sensor parts and first connecting parts connecting the first sensor parts; and a second sensing electrode including second sensor parts and second connecting parts connecting the second sensor parts, wherein the alignment structure includes a first pattern part provided in the same layer as the first sensor parts and the second sensor parts.

The first pattern part is formed of the same material as the first sensor parts and the second sensor parts.

The alignment structure may be formed of a transparent conductive oxide including at least one of indium tin oxide (ITO), indium zinc oxide (IZO), zinc oxide (ZnO), and indium tin zinc oxide (ITZO).

The input sensing unit may include: a first conductive layer in which any ones of the first connecting parts and the second connecting parts are disposed; a first insulating layer covering the ones of the first connecting parts and the second connecting parts; a second conductive layer in which the first sensor parts, the second sensor parts, the others of the first connecting parts and the second connecting parts, and the alignment structure are disposed; and a second insulating layer covering the first sensor parts, the second sensor parts, the others of the first connecting parts and the second connecting parts, and the alignment structure.

The input sensing unit may further include an opening formed on the alignment structure to expose the alignment structure to the outside.

The first conductive layer may be disposed under the second conductive layer, and the opening may be formed in the second insulating layer.

The first conductive layer may be disposed above the second conductive layer, and the opening may be formed to penetrate the first insulating layer and the second insulating layer.

Any ones of the first connecting parts and the second connecting parts may be disposed in a layer different from that of the first sensor parts and the second sensor parts, and the others of the first connecting parts and the second connecting parts may be disposed in the same layer as the first sensor parts and the second sensor parts.

The alignment structure may further include a second pattern part provided in the same layer as the ones of the first connecting parts and the second connecting parts.

The second pattern part may be formed of the same material as the first connecting parts and the second connecting parts.

The second pattern part may be formed of a metal including at least one of molybdenum, silver, titanium, copper, aluminum, and any alloy thereof.

The input sensing unit may include: a first conductive layer in which the others of the first connecting parts and the second connecting parts are disposed; a first insulating layer covering the others of the first connecting parts and the second connecting parts; a second conductive layer in which the first sensor parts, the second sensor parts, the ones of the first connecting parts and the second connecting parts, and the alignment structure are disposed; and a second insulating layer covering the first sensor parts, the second sensor parts, the ones of the first connecting parts and the second connecting parts, and the alignment structure.

The input sensing unit may further include an opening formed on the alignment structure to expose the alignment structure to the outside.

The first conductive layer may be disposed under the second conductive layer, and the opening may be formed in the second insulating layer.

The first conductive layer may be disposed above the second conductive layer, and the opening may be formed to penetrate the first insulating layer and the second insulating layer.

The first pattern part and the second pattern part may be provided adjacent to each other and may not overlap with each other.

The second pattern part may be formed at a position corresponding to the frame of the first pattern part.

The alignment structure may have a quadrangular ring shape or a T shape.

The display panel may include: a base substrate on which a display unit is formed; an encapsulation substrate encapsulating the display unit; and a sealing member disposed between the base substrate and the encapsulation substrate. The alignment structure may be formed at a position corresponding to the sealing member.

The alignment structure may be provided to align the encapsulation substrate and the base substrate.

An embodiment may be related to a display device.

The display device may include a display panel, an input sensing unit, and an alignment structure. The display panel may include a sealing member. The input sensing unit may be disposed on the display panel. The input sensing unit may include first-type sensor electrodes directly contacting a face of a first insulator of the display device, a first-type connector electrically connecting the first-type sensor electrodes, second-type sensor electrodes directly contacting the face of the first insulator of the display device, and a second-type connector electrically connecting the second-type sensor electrodes. The alignment structure may overlap the sealing member and may include a transparent member that directly contacts the face of the first insulator of the display device.

The transparent member may be formed of the same material as the first-type sensor electrodes and the second-type sensor electrodes.

The transparent member may be formed of a transparent conductive oxide including at least one of indium tin oxide (ITO), indium zinc oxide (IZO), zinc oxide (ZnO), and indium tin zinc oxide (ITZO).

The input sensing unit may include the following elements: a first insulating layer covering and directly contacting the second-type connector; and a second insulating layer covering and directly contacting each of the first-type sensor electrodes, the second-type sensor electrodes, the first-type connector, and the transparent member.

The input sensing unit may include an opening that exposes the transparent member.

The opening may be formed in the second insulating layer.

The opening may be formed in both the first insulating layer and the second insulating layer.

The first-type connector may directly contact the face of the first insulator of the display device, may overlap the second-type connector, and may be electrically insulated from the second-type connector.

The second-type connector may directly contact a face of a second insulator of the display device. The second insulator of the display device may overlap the first insulator of the display device. The alignment structure may include a conductive member. The conductive member may directly contact the face of the second insulator of the display device.

The conductive member may be formed of the same material as the second-type connector.

The conductive member may be formed of a metal including at least one of molybdenum, silver, titanium, copper, and aluminum.

The input sensing unit may include the following elements: a first insulating layer covering and directly contacting each of the second-type connector and the conductive member; and a second insulating layer covering and directly contacting each of the first-type sensor electrodes, the second-type sensor electrodes, the first-type connector, and the transparent member.

The input sensing unit may include an opening that exposes the transparent member.

The opening may be formed in the second insulating layer.

The opening may be formed in both the first insulating layer and the second insulating layer.

A portion of the transparent member may not overlap the conductive member.

One of the conductive member and the transparent member may surround another of the conductive member and the transparent member in a plan view of the display device.

The transparent member may be electrically conductive. A color of the transparent member may be different from a color of the conductive member.

The transparent member may have a quadrangular ring shape or a T shape in a plan view of the display device.

The display panel may include the following elements: a base substrate; a display unit disposed on the base substrate; and an encapsulation substrate encapsulating the display unit. The sealing member may be disposed between the base substrate and the encapsulation substrate.

DETAILED DESCRIPTION

Example embodiments are described with reference to drawings. Practical embodiments are not limited to certain shapes but are applicable to changes, equivalent materials, and replacements. The drawings are illustrative.

Like numbers may refer to like elements. In the drawings, thicknesses of elements or features may be exaggerated for clarity. Although the terms "first," "second," etc. may be used herein to describe various elements, these elements should not be limited by these terms. These terms are used to distinguish one element from another element. Thus, a "first" element discussed below could also be termed a "second" element without departing from the teachings of one or more embodiments. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

Singular forms may include plural forms as well, unless the context clearly indicates otherwise.

The terms "includes" and/or "including" may specify presence of stated features, integers, steps, operations, elements, and/or components, but may not preclude presence and/or addition of one or more other features, integers, steps, operations, elements, components, and/or groups.

An expression that a first element is placed "on" a second element may indicate not only that the first element is placed "directly on" the second element but also that an intervening element may be interposed between the first element and the second element.

The term "connect" may mean "electrically connect"; the term "formed" may mean "provided"; the term "part" may mean "member" or "component"; the term "conductive" may mean "electrically conductive."

Figure 1:
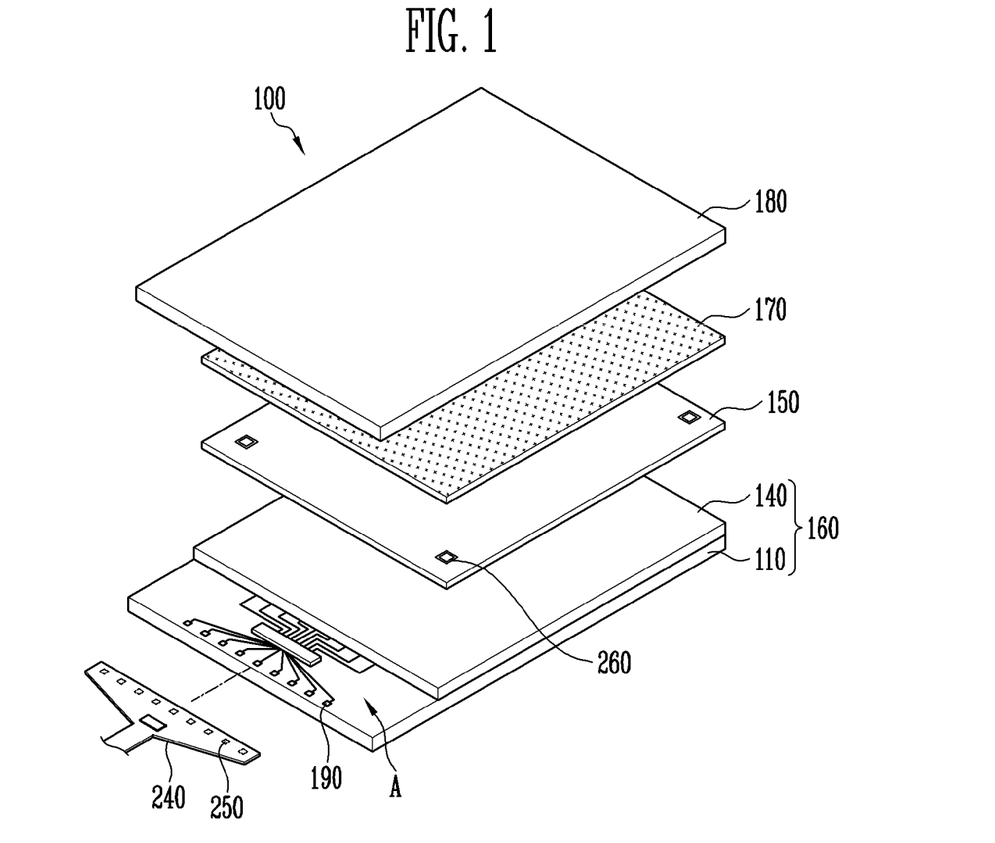
FIG. 1 is an exploded perspective view illustrating a display device according to an embodiment.
Figure 2:
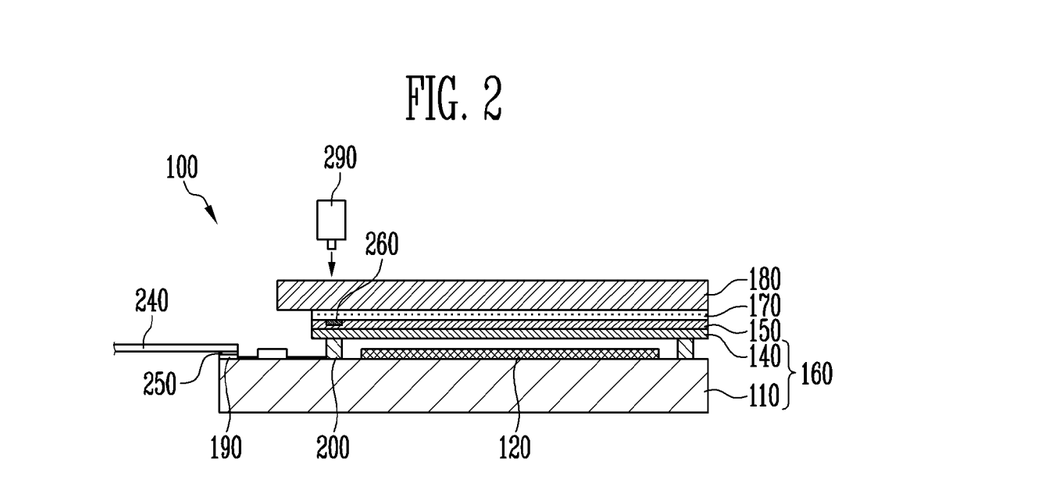
FIG. 2 is a cross-sectional view illustrating the display device of FIG. 1 according to an embodiment.

FIG. 1 is an exploded perspective view illustrating a display device 100 according to an embodiment. FIG. 2 is a cross-sectional view illustrating the display device of FIG. 1 according to an embodiment.

For example, the display device 100 may be an organic light emitting display device (OLED), a liquid crystal display device (LCD), a field emission display device (FED), or an electronic paper display device (EPD).

The display device 100 may be a rigid display device or a flexible display device.

Referring to FIGS. 1 and 2, the display device 100 may include a display panel 160, an input sensing unit 150, an anti-reflection unit 170, and a window unit 180.

The display panel 160 may include a base substrate 110, a display unit 120 provided on the base substrate 110, and an encapsulation substrate 140 for encapsulating the display unit 120.

The base substrate 110 may be a glass substrate, a polymer substrate, a flexible film, a metal substrate, or a composite substrate.

The encapsulation substrate 140 may be a glass substrate, a polymer resin, or a flexible film.

A sealing member 200 is formed between the base substrate 110 and the encapsulation substrate 140 to encapsulate the display unit 120. The sealing member 200 may be formed along edges of surfaces of the base substrate 110 and the encapsulation substrate 140. The sealing member 200 may include a UV curing resin.

The display unit 120 may include a display element layer including at least one light emitting element for displaying an image and a circuit element layer for controlling the light emitting element.

The circuit element layer includes at least one insulating layer and a circuit element. The insulating layer includes at least one intermediate inorganic layer and at least one intermediate organic layer. The circuit element includes a signal line, a driving circuit of a pixel, etc. The circuit element layer may be formed through a process of forming an insulating layer, a semiconductor layer, and conductive layer through coating, deposition, etc. and a process of patterning the insulating layer, the semiconductor layer, and the conductive layer through photolithography.

The display element layer includes a light emitting element. The display element layer may include organic light emitting diodes. The display element layer may further include an organic layer such as a pixel defining layer.

In an embodiment, the input sensing unit 150 may be formed on the encapsulation substrate 140. The input sensing unit 150 may acquire coordinate information of an external input (e.g., a touch event). The input sensing unit 150 may be a touch sensing panel for sensing a touch of a user or a fingerprint sensing panel for sensing fingerprint information of a finger of the user. The input sensing unit 150 may be a digitizer sensing panel for sensing a digitizer pen. The input sensing unit 150 may partially or completely overlap a display area (in which an image is displayed on the display unit 120) and/or a non-display area.

The input sensing unit 150 may be a layer, as shown in FIGS. 1 and 2. The layer-shaped input sensing unit 150 may be disposed directly on a base surface provided by the display panel 160. In an embodiment, the base surface may be an upper surface of the encapsulation substrate 140. In an embodiment, the input sensing unit 150 may be a panel. The panel may include a base layer provided with the base surface, e.g., a synthetic resin film, a composite material film, or a glass substrate.

The anti-reflection unit 170 may be formed on the input sensing unit 150. The anti-reflection unit 170 decreases reflection of external light incident from an upper side of the window unit 180. In an embodiment, the anti-reflection unit 170 may include a retarder and a polarizer. The retarder may be of a film type or a liquid crystal coating type, and may be/include a λ3/4 retarder or a λ/4 retarder. The polarizer may be a film or a liquid crystal coating. The film may be/include a stretched synthetic resin film, and the liquid crystal coating may include liquid crystals arranged in a predetermined arrangement. The anti-reflection unit 170 may further include a protective film. The retarder, the polarizer, and/or the protective film may form a base layer of the anti-reflection unit 170.

In an embodiment, the anti-reflection unit 170 may include color filters. The color filters may have a predetermined arrangement. The arrangement of the color filters may be determined by considering colors of lights emitted from pixels included in the display panel 160. The anti-reflection unit 170 may further include a black matrix adjacent to the color filters.

In an embodiment, the anti-reflection unit 170 may include a destructive interference structure. For example, the destructive interference structure may include a first reflective layer and a second reflective layer overlapping each other. First reflected light and second reflected light, which are respectively reflected in the first reflective layer and the second reflective layer, may destructively interfere with each other, and accordingly, reflection of external light can be decreased.

The window unit 180 is provided on the top of the anti-reflection unit 170 to protect the display device 100. The window unit 180 may include (rigid) glass.

An alignment structure 260 is formed on the encapsulation substrate 140. The alignment structure 260 may facilitate the base substrate 110 and the encapsulation substrate 140 to be coupled to each other at a predetermined position when the base substrate 110 and the encapsulation substrate 140 are joined together.

The base substrate 110 may include an area A positioned beyond an edge of the encapsulation substrate 140. A plurality of conductive pads 190 are arranged in the exposed area A of the base substrate 110 and are spaced from each other.

Terminals 250 of a circuit board 240 may be electrically connected to the pads 190 to transfer signals from an external device to the base substrate 110. The circuit board 240 may be a flexible printed circuit board (FPCB).

Figure 3:
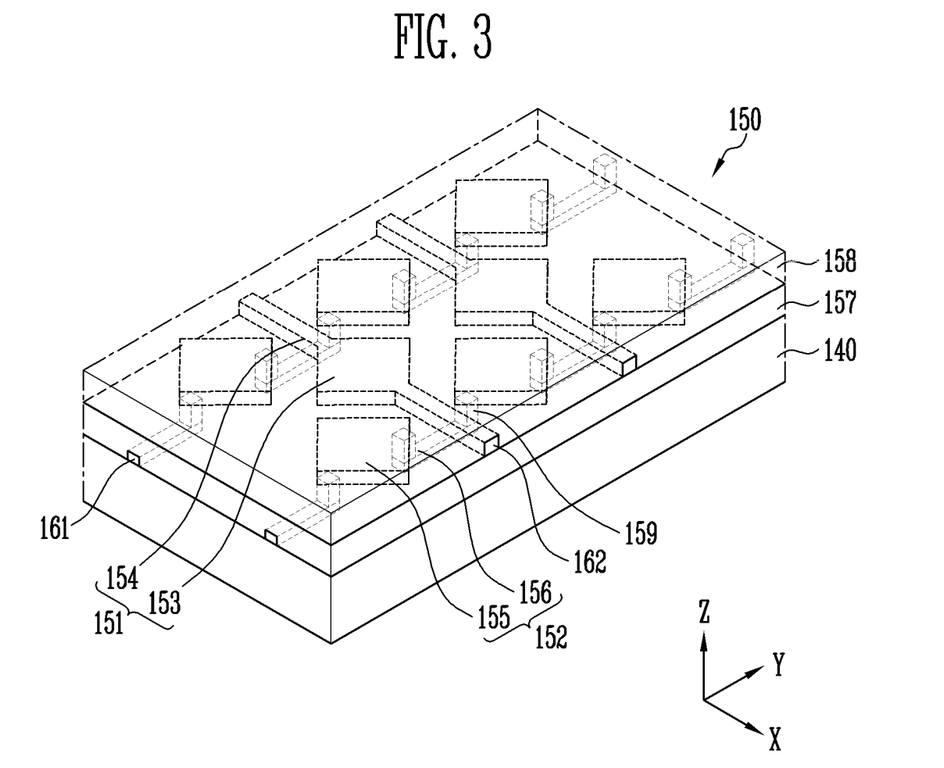
FIG. 3 is a perspective view illustrating an input sensing unit of the display device of FIG. 1 according to an embodiment.

FIG. 3 is a perspective view illustrating the input sensing unit 150 according to an embodiment.

For example, the input sensing unit 150 may be an electrostatic capacitive type input sensing unit, a resistive type input sensing unit, an electro-magnetic type input sensing unit, a saw type input sensing unit, or an infrared type input sensing unit.

Referring to FIG. 3, the input sensing unit 150 is formed on the encapsulation substrate 140. The input sensing unit 150 may be directly formed on the encapsulation substrate 140 or may be formed on a separately provided substrate.

First sensing electrodes 151 and second sensing electrodes 152 may be alternately disposed on the encapsulation substrate 140.

A lengthwise direction of each first sensing electrode 151 is a first direction (X direction), which may be parallel to a first edge of the encapsulation substrate 140. Corners/edges of neighboring first sensing electrodes 151 may face each other. A first sensing electrode 151 includes a plurality of first sensor parts 153 and a plurality of first connecting parts 154 for electrically connecting the first sensor parts 153.

A first sensor part 153 may have a quadrilateral shape, e.g., a diamond/rhombus shape or a square shape. A plurality of first sensor parts 153 may be formed in a line along the first direction (X direction). A first connecting part 154 is connected between two first sensor parts 153 arranged immediately adjacent to each other along the first direction (X direction).

A second sensing electrode 152 is disposed between a pair of adjacent first sensing electrodes 151. A lengthwise direction of each second sensing electrodes 152 is a second direction (Y direction), which may be parallel to a second edge of the encapsulation substrate 140. Corners/edges of neighboring second sensing electrodes 152 may face each other. A second sensing electrode 152 includes a plurality of second sensor parts 155 and a plurality of second connecting parts 156 for electrically connecting the second sensing parts 155.

A second sensor part 155 may have a quadrilateral shape, e.g., a diamond/rhombus shape or a square shape. A plurality of second sensor parts 155 may be formed in a line along the second direction (Y direction). A second connecting part 156 connects two immediately neighboring second sensor parts 155 to each other.

Two first sensor parts 153 disposed adjacent to each other (in the X direction) are connected to each other by a first connecting part 154 disposed on the same plane. Two second sensor parts 155 disposed adjacent to each other (in the Y direction) are connected to each other by a second connecting part 156 disposed on another plane so as to avoid interference with the first sensing electrode 151.

In an embodiment, as shown in FIG. 3, the second connecting parts 156 may be formed in a first conductive layer 161 on the encapsulation substrate 140; the first sensor parts 153, the second sensor parts 155, and the first connecting parts 154 may be provided in a second conductive layer 162 above the first conductive layer 161. In an embodiment, the first sensor parts 153, the second sensor parts 155, and the first connecting parts 154 may be formed in the first conductive layer 161 on the encapsulation substrate 140; the second connecting parts 156 may be provided in the second conductive layer 162 above the first conductive layer 161.

A first insulating layer 157 is provided on the encapsulation substrate 140. The first insulating layer 157 covers the second connecting parts 156 formed in the first conductive layer 161. A second insulating layer 158 is provided on the first insulating layer 157. The second insulating layer 158 covers the first sensor parts 153, the second sensor parts 155, and the first connecting parts 154, which are formed in the second conductive layer 162. The first insulating layer 157 and the second insulating layer 158 may insulate the first sensing electrodes 151 and the second sensing electrodes 152 from each other.

In an embodiment, the first sensor parts 153, the second sensor parts 155, and the first connecting parts 154 are provided in the first conductive layer 161; the second connecting parts 156 is provided in the second conductive layer 162; the first insulating layer 157 may cover the first sensor parts 153, the second sensor parts 155, and the first connecting parts 154; the second insulating layer 158 may cover the second connecting parts 156.

A plurality of contact holes 159 are formed in the first insulating layer 157. The contact holes 159 are formed in areas corresponding to corner portions of second sensor parts 155 disposed adjacent to each other and facing each other.

The second connecting parts 156 may be disposed inside the first insulating layer 157. End portions of a second connecting part 156 may extend in a vertical direction (Z direction) in the corresponding contact holes 159. The end portions of the second connecting part 156 may directly contact second sensor parts 155. The second connecting part 156 may electrically connect two adjacent second sensor parts 155 to each other.

The first sensor part 153 and the second sensor part 155 may include or may be formed of a transparent conductive oxide such as indium tin oxide (ITO), indium zinc oxide (IZO), zinc oxide (ZnO), or indium tin zinc oxide (ITZO). In an embodiment, the first connecting part 154 and the second connecting part 156 may include or may be formed of a metal such as molybdenum, silver, titanium, copper, aluminum or an alloy.

Each of the first insulating layer 157 and the second insulating layer 158 may include or may be formed of an inorganic material, an organic material, or a composite material.

At least one of the first insulating layer 157 and the second insulating layer 158 may include an inorganic layer. In embodiments, the second insulating layer 158, in which the first sensor part 153 and the second sensor part 155 are provided, may be configured with an inorganic layer. The inorganic layer may include at least one of aluminum oxide, titanium oxide, silicon oxide, silicon oxynitride, zirconium oxide, and hafnium oxide.

At least one of the first insulating layer 157 and the second insulating layer 158 may include an organic layer. In embodiments, the first insulating layer 157 may be configured with an organic layer. The organic layer may include at least one of acryl-based resin, methacryl-based resin, polyisoprene, vinyl-based resin, epoxy-based resin, urethane-based resin, cellulose-based resin, siloxane-based resin, polyimide-based resin, polyamide-based resin, and perylene-based resin.

When an input means such as a finger approaches or contacts the encapsulation substrate 140, the input sensing unit 150 may detect a touch position by measuring a capacitance varied between the first sensing electrode 151 and the second sensing electrode 152.

Figure 4:
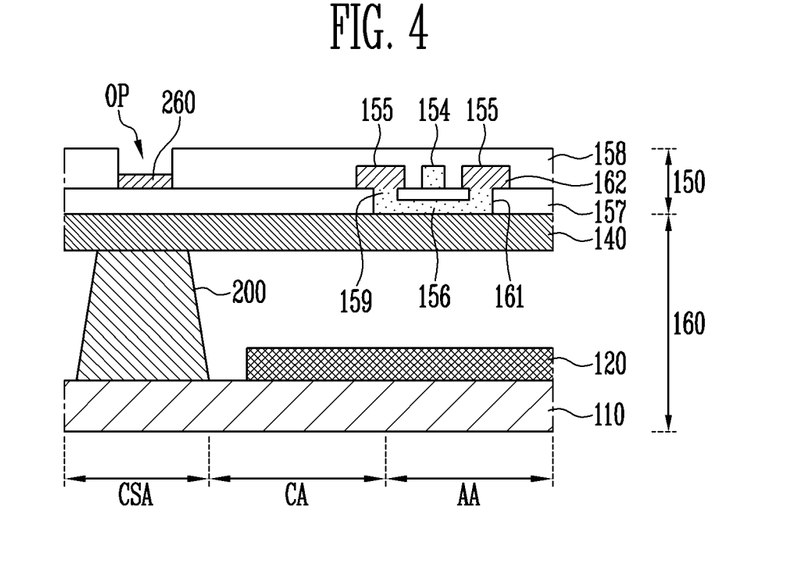
FIG. 4 is a cross-sectional view illustrating a portion of the display device of FIG. 1 according to an embodiment.

FIG. 4 is a cross-sectional view illustrating a portion of the display device 100 of FIG. 1 according to an embodiment.

Referring to FIG. 4, the display panel 160 includes an active area AA in which the display unit 120 is formed on the base substrate 110, a circuit area CA positioned beyond the active area AA, and a cell seal area CSA positioned beyond the circuit area CA.

The active area AA includes an area in which a pixel is formed, an area in which a transistor is formed, and an area in which a capacitor is formed. The circuit area CA includes an area in which a circuit pattern for transferring an electrical signal to the active area AA is formed. The cell seal area CSA includes an area in which the sealing member 200 is formed.

The base substrate 110 may be a glass substrate, a polymer substrate, a flexible film, a metal substrate, or a composite substrate. The base substrate 110 may be transparent, opaque, or translucent.

The display unit 120 may be formed in the active area AA. A pixel circuit including at least one transistor, at least one capacitor, and a light emitting element may be provided in the display unit 120.

Circuit patterns may be provided in the circuit area CA. The circuit patterns may include, for example, a power supply pattern, an anti-electrostatic pattern, and other circuit patterns.

The sealing member 200 is formed in the cell seal area CSA. The sealing member 200 is formed between the base substrate 110 and the encapsulation substrate 140. The sealing member 200 may be formed in the cell seal area CSA along an edge of the display panel 160. The sealing member 200 may be formed as a continuous structure to protect the display unit 120. The sealing member 200 seals between the base substrate 110 and the encapsulation substrate 140.

In embodiments, the sealing member 200 may include a UV curing resin.

The encapsulation substrate 140 is coupled to the base substrate 110. The encapsulation substrate 140 may protect an organic light emitting element, etc. from external moisture or oxygen.

The encapsulation substrate 140 may be a glass substrate, a polymer resin substrate, or a flexible film. The encapsulation substrate 140 may include alternately stacked organic layers and inorganic layers on the organic light emitting element.

The first conductive layer 161 (including the first sensor parts 153, the first connecting parts 154, and the second sensor parts 155), the first insulating layer 157, the second conductive layer 162 (including the second connecting parts 156), and the second insulating layer 158, which are components of the input sensing unit 150, may be provided on the encapsulation substrate 140.

An alignment structure 260 may overlap the cell seal area CSA and may be positioned in the input sensing unit 150. The alignment structure 260 may overlap the sealing member 200.

In embodiments, the alignment structure 260 is formed in the same conductive layer as the first sensor parts 153 and the second sensor parts 155. The alignment structure 260 may be formed in the second conductive layer 162. In an embodiment, the first sensor parts 153 and the second sensor parts 155 may be formed in the first conductive layer 161, and the alignment structure 260 may be formed in the first conductive layer 161.

The alignment structure 260 may be formed through the same process step(s) as the first sensor parts 153 and the second sensor parts 155, may include the same material(s) as the first sensor parts 153 and the second sensor parts 155, and/or may have the same stacking structure as the first sensor parts 153 and the second sensor parts 155. In an embodiment, the alignment structure 260 may include a transparent conductive oxide such as indium tin oxide (ITO), indium zinc oxide (IZO), zinc oxide (ZnO), or indium tin zinc oxide (ITZO).

In an embodiment, the alignment structure 260 may have a thickness equal to that of each of the first sensor parts 153 and the second sensor parts 155. In an embodiment, the thickness of the alignment structure 260 may be 1000 Å or more. The thickness of the alignment structure 260 may be smaller than that of an insulating layer (e.g., 158) in which the alignment structure 260 is formed. The thickness of the insulating layer may be, for example, 3000 Å. As the thickness of the alignment structure 260 is formed sufficiently thick, the alignment structure 260 may be sufficiently visible when the display panel 160 is aligned with another component, with the alignment structure 260 as an indicator.

In embodiments, the alignment structure 260 may be exposed from the input sensing unit 150 through an opening OP formed on the alignment structure 260 in the first insulating layer 157 and/or the second insulating layer 158. Since the alignment structure 260 is exposed through the opening OP, the alignment structure 260 can sufficiently visible when the display panel 160 is aligned with another component.

The opening OP may have a shape corresponding, similar, and/or identical to the shape of the alignment structure 260. The opening OP may have an area equal to that of the alignment structure 260. In an embodiment, the opening OP may have an area narrower than that of the alignment structure 260.

In an embodiment, the alignment structure 260 may be formed through the same process step(s) as the first sensor parts 153 and the second sensor parts 155, the first insulating layer 157 and/or the second insulating layer 158 may be formed over the alignment structure 260, and the opening OP may be then formed in the first insulating layer 157 and/or the second insulating layer 158 through an etching process.

In embodiments, the first sensor parts 153 and the second sensor parts 155 may be formed, the first insulating layer 157 or the second insulating layer 158 may be formed over the first sensor parts 153 and the second sensor parts 155, the opening OP may be formed through an etching process, and the alignment structure 260 may be then formed by injecting a transparent conductive oxide into the opening OP.

In a process of manufacturing the display device 100, the base substrate 110 and the encapsulation substrate 140 are aligned at a predetermined position using the alignment structure 260 to indicate alignment. In the manufacturing process, a laser irradiation device 290 illustrated in FIG. 2 may irradiate a laser beam onto the sealing member 200 located between the base substrate 110 and the encapsulation substrate 140, the sealing member 200 is melted, so that the base substrate 110 and the encapsulation substrate 140 are firmly coupled to each other.

In the coupling process, the alignment structure 260 formed on the encapsulation substrate 140 is aligned with a corresponding alignment structure formed on the base substrate 110, and the alignment may be verified using a vision device, so that the base substrate 110 and the encapsulation substrate 140 can be accurately aligned at the predetermined position.

Figure 5A:
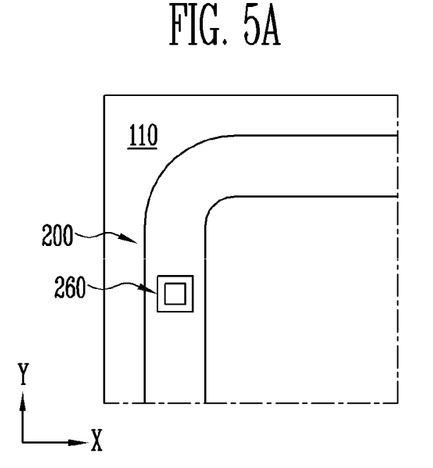
FIG. 5A is a plan view illustrating a cell seal area illustrated in FIG. 4 according to an embodiment.
Figure 5B:
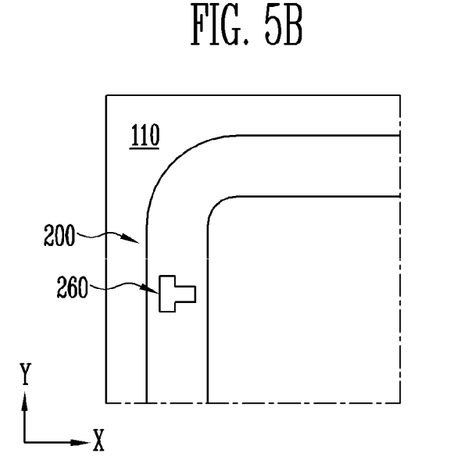
FIG. 5B is a plan view illustrating a cell seal area illustrated in FIG. 4 according to an embodiment.

FIG. 5A is a plan view illustrating the cell seal area illustrated in FIG. 4 according to an embodiment. FIG. 5B is a plan view illustrating the cell seal area illustrated in FIG. 4 according to an embodiment.

Referring to FIGS. 5A and 5B, the sealing member 200 may overlap the alignment structure 260 in the vertical direction (Z-direction) perpendicular to an image display face of the display panel 160. The sealing member 200 may include a continuous member disposed along an edge of the display panel 160 on the cell seal area CSA. The alignment structure 260 may be formed at a corner of the display panel 160. In an embodiment, the display panel 160 has a quadrangular shape, and one alignment structure 260 may be formed at each corner. The arrangement of the sealing member 200 and the alignment structure 260 may be configured according to the shape and size of the display panel 160.

In embodiments, the alignment structure 260 may have a quadrangular shape as shown in FIG. 5A. In embodiment, the alignment structure 260 may have a T shape as shown in FIG. 5B. The alignment structures 260 may have one or more of various shapes, such as one of more of a quadrangular shape, a rectangular shape, and an elliptical shape. The alignment structure 260 may be configured with one fragment. The alignment structure 260 may include a plurality of fragments forming a specific pattern.

Figure 6:
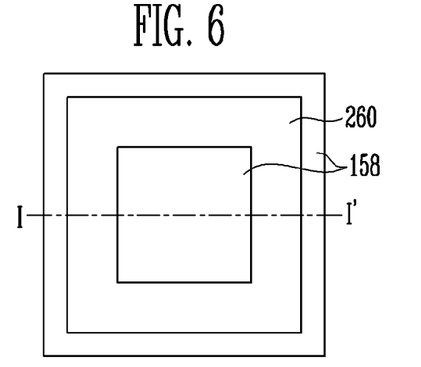
FIG. 6 is a plan view illustrating an alignment structure according to an embodiment.
Figure 7:
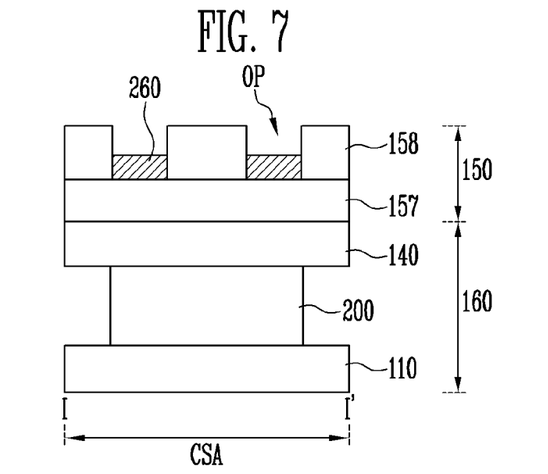
FIG. 7 illustrates a cross-sectional view taken along line I-I' of FIG. 6 according to an embodiment.
Figure 8:
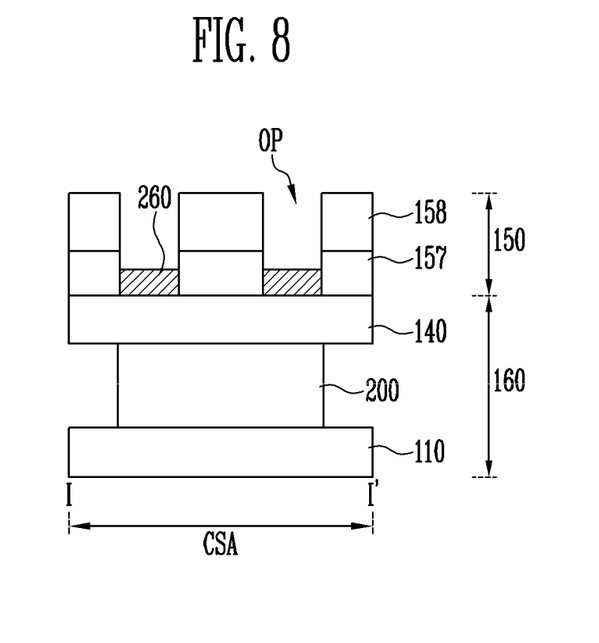
FIG. 8 illustrates a cross-sectional view taken along line I-I' of FIG. 6 according to an embodiment.

FIG. 6 is a plan view illustrating an alignment structure according to an embodiment. FIG. 7 is a cross-sectional view illustrating taken along line I-I' of FIG. 6 according to an embodiment. FIG. 8 is a view illustrating a cross-sectional taken along line I-I' of FIG. 6 according to an embodiment.

Referring to FIGS. 6 to 8, the alignment structure 260 is formed in the same conductive layer as the first sensor parts 153 and the second sensor parts 155. When the first sensor parts 153 and the second sensor parts 155 are formed in the second conductive layer 162, the alignment structure 260 is formed in the second conductive layer 162 as shown in FIG. 7. When the first sensor parts 153 and the second sensor parts 155 are formed in the first conductive layer 161, the alignment structure 260 is formed in the first conductive layer 161 as shown in FIG. 8.

The alignment structure 260 may be formed through the same process step(s) as the first sensor parts 153 and the second sensor parts 155, to include the same material(s) and have the same stacking structure as the first sensor parts 153 and the second sensor parts 155. In embodiments, the alignment structure 260 may include a transparent conductive oxide such as indium tin oxide (ITO), indium zinc oxide (IZO), zinc oxide (ZnO), or indium tin zinc oxide (ITZO).

An opening OP having a shape corresponding to the alignment structure 260 may be formed on the alignment structure 260. As shown in FIG. 7, when the alignment structure 260 is formed in the second conductive layer 162, the opening OP may be formed in the second insulating layer 158. As shown in FIG. 8, when the alignment structure 260 is formed in the first conductive layer 161, the opening OP may be formed in both the first insulating layer 157 and the second insulating layer 158.

The alignment structure 260 is exposed from the input sensing unit 150 through the opening OP, so that the alignment structure 260 can be effectively visible.

The alignment structure 260 may have a quadrangular shape as shown in FIG. 6. The alignment structure 260 may have one or more of various shapes, such as one or more of a quadrangular shape, a rectangular shape, a circular shape, an elliptical shape, and a T shape.

Figure 9:
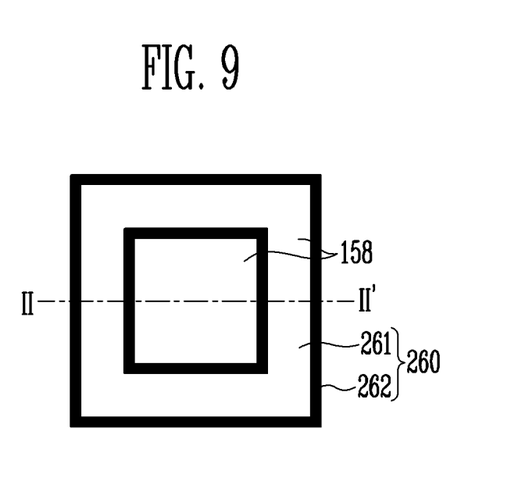
FIG. 9 is a plan view illustrating an alignment structure according to an embodiment.
Figure 10:
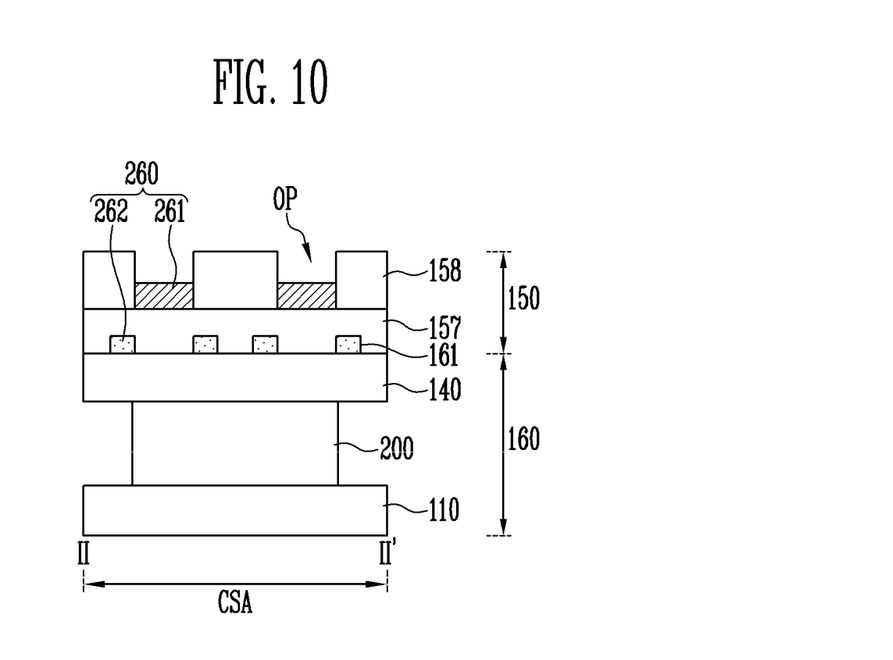
FIG. 10 illustrates a cross-sectional view taken along line II-II' of FIG. 9 according to an embodiment.
Figure 11:
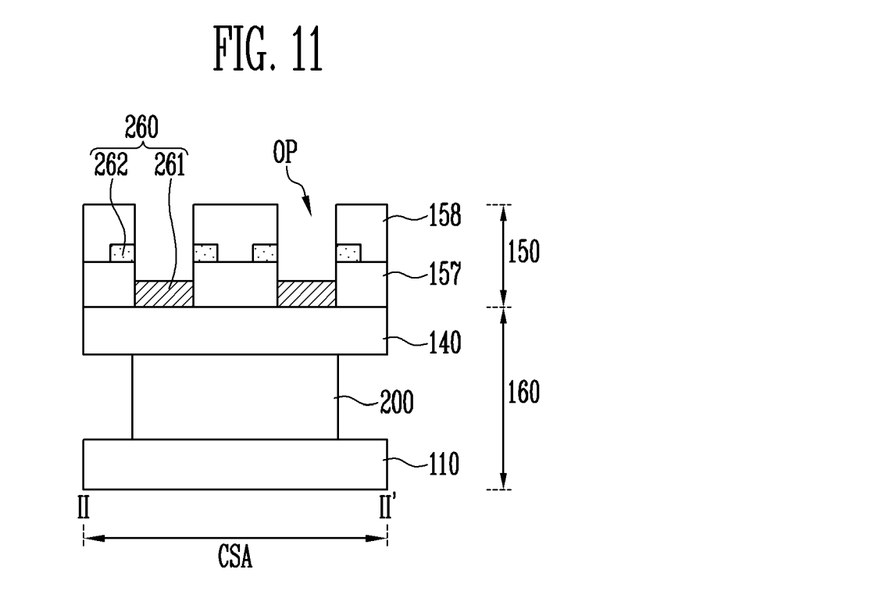
FIG. 11 illustrates a cross-sectional view taken along line II-II' of FIG. 9 according to an embodiment.

FIG. 9 is a plan view illustrating an alignment structure according to an embodiment. FIG. 10 is a cross-sectional view taken along line II-II' of FIG. 9 according to an embodiment. FIG. 11 is a cross-sectional view taken along line II-II' of FIG. 9 according to an embodiment.

Referring to FIGS. 9 to 11, the alignment structure 260 may include a first pattern part 261 formed in the same conductive layer as the first sensor parts 153 and the second sensor parts 155 and may include a second pattern part 262 formed in a conductive layer different from that of the first sensor parts 153 and the second sensor parts 155.

In an embodiment, the first pattern part 261 may be formed through the same process step(s) as the first sensor parts 153 and the second sensor parts 155, to include the same material(s) and have the same stacking structure as the first sensor parts 153 and the second sensor parts 155. In embodiments, the first pattern part 261 may include a transparent conductive oxide such as indium tin oxide (ITO), indium zinc oxide (IZO), zinc oxide (ZnO), or indium tin zinc oxide (ITZO).

The second pattern part 262 may be formed through the same process step(s) as the second connecting parts 156 formed in the same layer, to include the same material(s) and have the same stacking structure as the second connecting parts 156. In an embodiment, the second pattern part 262 may include a metal such as molybdenum, silver, titanium, copper, aluminum or an alloy.

The first pattern part 261 and the second pattern part 262 are in contact with each other or at least adjacent to each other but may not substantially overlap each other in the vertical direction (Z-direction) perpendicular to the image display face of the display panel 160. In an embodiment, the first pattern part 261 may have one or more shapes, such as one or more of a quadrangular shape, a rectangular shape, a circular shape, an elliptical shape, and a T shape in a plan view of the display device 100, and a second pattern part 262 may correspond to and/or overlap the boundary/edge(s) of the first pattern part 261 in the plan view of the display device 100 without overlapping an inner portion of the first pattern part 261. An outer second pattern part 262 may surround the first pattern part 261 in a plan view of the display device 100. An inner second pattern part 262 may be surrounded by the first pattern part 261 in the plan view of the display device 100.

In embodiments, the first pattern part 261 and the second pattern part 262 are formed of different materials, to have different colors. The first pattern part 261 and the second pattern part 262, which have different colors, are in contact with each other or at least adjacent to each other, so that effective visibility and identification of the alignment structure 260 can be attained.

In an embodiment, an opening OP may be formed on the first pattern part 261 to expose the first pattern part 261 to the outside from the input sensing unit 150. As shown in FIG. 10, the first pattern part 261 may be disposed in a layer located above the second pattern part 262 such that the opening OP is efficiently formed on only the first pattern part 261. The first pattern part 261 may be formed in the second conductive layer 162, and the second pattern part 262 may be formed in the first conductive layer 161.

In an embodiment, as shown in FIG. 11, the first pattern part 261 may be formed in the first conductive layer 161, and the second pattern part 262 may be formed in the second conductive layer 162. In an embodiment, the opening OP may be formed on the first pattern part 261. The opening OP may have a width narrower than that of the first pattern part 261, so that the second pattern part 262 can be prevented from being exposed to the outside.

In a display device according to embodiments, the visibility of the alignment structure formed on the display panel is effective. Thus, sufficient alignment accuracy between the display panel and the window panel can be attained, and process failure can be reduced or prevented.

In a display device according to embodiments, the alignment structure includes a transparent conductive member. Thus, external energy can reach the sealing member formed under the alignment structure. Accordingly, the adhesion between the display panel and the window panel can be effectively performed.

Example embodiments have been disclosed. Although specific terms are employed, they are to be interpreted in a generic and descriptive sense and are not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Various changes in form and details may be made without departing from the scope set forth in the following claims.

What is claimed is:

1. A display device comprising:
   a display panel including a display area and a non-display area;
   a sensing unit disposed on the display area of the display panel, wherein the sensing unit includes sensor electrodes, a connecting part electrically connecting adjacent sensor electrodes, a first insulating layer disposed between the sensor electrodes and the connecting part, and a second insulating layer disposed on the sensor electrodes and the connecting part; and
   a mark overlapping the non-display area and including a first pattern part formed in a same conductive layer as the sensor electrodes and a second pattern part formed in a same conductive layer as the connecting part, and
   wherein at least one of the first insulating layer and the second insulation layer includes an opening exposing at least a portion of the first pattern part, and
   wherein the second pattern part overlaps the second insulating layer in a thickness direction.

2. The display device of claim 1, wherein the second pattern part overlaps a boundary of the first pattern part in a direction perpendicular to the display area of the display panel.

3. The display device of claim 1, wherein the second pattern part includes an outer second pattern part and an inner second pattern part.

4. The display device of claim 3, wherein the outer second pattern part surrounds the first pattern part and the inner second pattern part is surrounded by the first pattern part.

5. The display device of claim 1, wherein the display panel includes a light emitting layer and an encapsulation layer disposed on the light emitting layer.

6. The display device of claim 5, wherein the sensing unit is disposed directly on the encapsulation layer.

7. The display device of claim 1, wherein the opening is disposed between opposite portions of the second pattern part.

8. The display device of claim 1, wherein the opening penetrates through the second insulating layer and exposes the first insulating layer.

9. The display device of claim 1, wherein the opening penetrates through both the first insulating layer and the second insulating layer.

10. The display device of claim 1, wherein the first pattern part is in contact with the first insulating layer through the opening.

11. The display device of claim 1, wherein the first pattern part includes a transparent conductive layer.

12. The display device of claim 11, wherein the transparent conductive layer includes at least one of indium tin oxide (ITO), indium zinc oxide (IZO), zinc oxide (ZnO), and indium tin zinc oxide (ITZO).

13. The display device of claim 1, wherein the second pattern part includes at least one of molybdenum, silver, titanium, copper, and aluminum.

14. A display device comprising:
    a display panel including a sealing part;
    a sealing member disposed on the display panel;
    a sensing unit disposed on the display panel, wherein the sensing unit includes sensor electrodes, a connecting part electrically connecting adjacent sensor electrodes, a first insulating layer disposed between the sensor electrodes and the connecting part, and a second insulating layer disposed on the first insulating layer; and
    a mark including a first pattern part formed in a same conductive layer as the sensor electrodes and a second pattern part formed in a same conductive layer as the connecting part,
    wherein the second pattern part directly contacts the first insulating layer,
    wherein an opening penetrates through the second insulating layer and exposes a conductive surface of the first pattern part, and
    wherein the sealing member overlaps the opening in a thickness direction.

15. The display device of claim 14, wherein:
    the sealing member overlaps at least a portion of the mark.

16. The display device of claim 15, wherein the display panel includes:
    a base substrate;
    a light emitting layer disposed on the base substrate; and
    an encapsulation layer disposed on the light emitting layer, and
    wherein the sealing member is disposed between the base substrate and the encapsulation layer.

17. The display device of claim 16, wherein the sensing unit is disposed directly on the encapsulation layer.

18. The display device of claim 14, wherein the second pattern part overlaps a boundary of the first pattern part.

19. The display device of claim 14, wherein the second pattern part includes an outer second pattern part surrounding the first pattern part and an inner second pattern part surrounded by the first pattern part.

20. The display device of claim 19, wherein the outer second pattern part overlaps a boundary of the sealing member.

21. The display device of claim 15,
    wherein a center of the first pattern part and a center of the sealing member coincide.

* * * * *